United States Patent [19]
Funahashi

[11] Patent Number: 5,721,972
[45] Date of Patent: Feb. 24, 1998

[54] CAMERA WITH A ZOOM FUNCTION

[75] Inventor: Akira Funahashi, Sakai, Japan

[73] Assignee: Minolta Co., Ltd., Osaka, Japan

[21] Appl. No.: 790,595

[22] Filed: Jan. 29, 1997

[30] Foreign Application Priority Data

Jan. 31, 1996 [JP] Japan ................. 8-014810

[51] Int. Cl.$^6$ .............. G03B 15/03; G03B 13/02
[52] U.S. Cl. ............................. 396/62; 396/378
[58] Field of Search ................. 396/61, 62, 175, 396/377, 378, 379, 382, 383, 795, 861, 862, 863

[56] References Cited

U.S. PATENT DOCUMENTS

| | | |
|---|---|---|
| 4,914,461 | 4/1990 | Hori ........................... 396/62 |
| 4,945,372 | 7/1990 | Higuchi et al. ............. 396/62 |
| 5,335,030 | 8/1994 | Suzuka ....................... 396/62 |

Primary Examiner—Safet Metjahic
Assistant Examiner—Nicholas J. Tuccillo
Attorney, Agent, or Firm—Burns, Doane, Swecker & Mathis, LLP

[57] ABSTRACT

A camera wherein a finder cam follower and a flash cam follower are elastically pulled in a wide direction and are in contact with a cam surface of a cam. The cam rotates clockwise or counterclockwise following a zoom movement of a photographic lens. With the rotation of the cam, the finder cam follower moves, thereby moving a finder lens, and the flash cam follower moves, thereby moving a xenon flash lamp and a reflector.

9 Claims, 5 Drawing Sheets

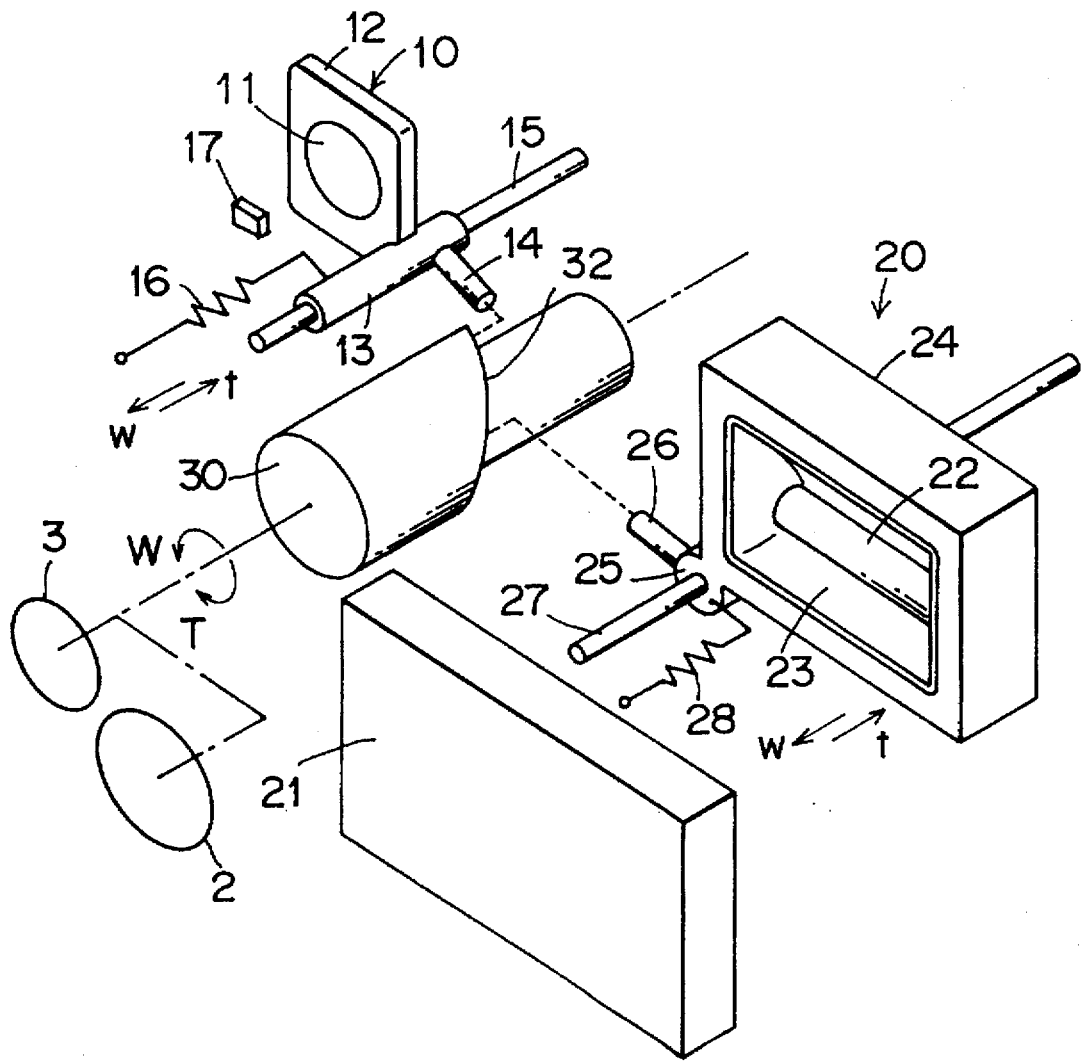
F I G. 4

CAMERA WITH A ZOOM FUNCTION

BACKGROUND OF THE INVENTION

1. Field of the Invention

The present invention relates to a camera with a zoom function, and more particularly to a camera which has a built-in finder and a built-in flash which move following a zoom movement of a photographic lens.

2. Description of Related Art

There have been provided cameras with a zoom function which are of a type wherein a flash as well as a finder moves for a zoom. In such a type of cameras, a cam exclusive for the movement of the flash is provided, or a flash holder holding a flash lamp and a reflector is fixed to a member of the finder to be moved for a zoom so that the flash holder and the finder move together for a zoom.

However, such cameras have the following problems. In the former case of providing the exclusive cam, a connecting member for connecting the cam to a zoom mechanism of a photographic lens is also required, and the cam and the connecting member consume space and increase cost. In the latter case of integrating the member of the finder to be moved and the flash holder, a heavy load is applied to the finder because the flash holder is heavy and because a lead wire is drawn. Thereby, the finder may vibrate, and/or the position of the finder may become inaccurate, resulting in deterioration of the optical performance of the finder.

SUMMARY OF THE INVENTION

An object of the present invention is to provide a camera with a zoom function wherein a finder and a flash can be moved for a zoom by a compact mechanism without deteriorating the optical performance of the finder.

In order to attain the object, a camera according to the present invention comprises a photographic lens for taking an image; a cam which operates following a zoom movement of the photographic lens, the cam having a cam surface; a finder which has a first cam follower which is in contact with the cam surface at a first position; and a flash which has a second cam follower which is in contact with the cam surface at a second position different from the first position. The first and second cam followers move following operation of the cam, thereby moving the flash and the finder.

In the camera, the finder and the flash move for a zoom following a single cam, but the movement of the finder and the movement of the flash are independent of each other. By using a single cam, a compact and inexpensive zoom mechanism of the finder and the flash can be realized. Moreover, a heavy load, that is, a load of a member of the flash to be moved is not applied to a member of the finder to be moved, and there is no fear that the optical performance of the finder may deteriorate.

Further, in the camera according to the present invention, preferably, the region where the second cam follower moves while keeping in contact with the cam surface extends to a further tele side or to a further wide side than the region where the first cam follower moves while keeping in contact with the cam surface. With the arrangement, the first and second cam followers move In respective exclusive moving ranges in a tele side or in a wide side. Accordingly, the regions of the cam surface corresponding to the exclusive ranges can be shaped to match the respective zoom movement characteristics of the finder and the flash.

BRIEF DESCRIPTION OF THE DRAWINGS

This and other objects and features of the present invention will be apparent from the following description with reference to the accompanying drawings, in which:

FIG. 4 is a perspective view of a camera which is a second embodiment of the present invention.

DETAILED DESCRIPTION OF THE PREFERRED EMBODIMENTS

Cameras with a zoom function which are embodiments of the present invention are described with reference to the accompanying drawings.

First Embodiment; See FIGS. 1–3

Figure 1:
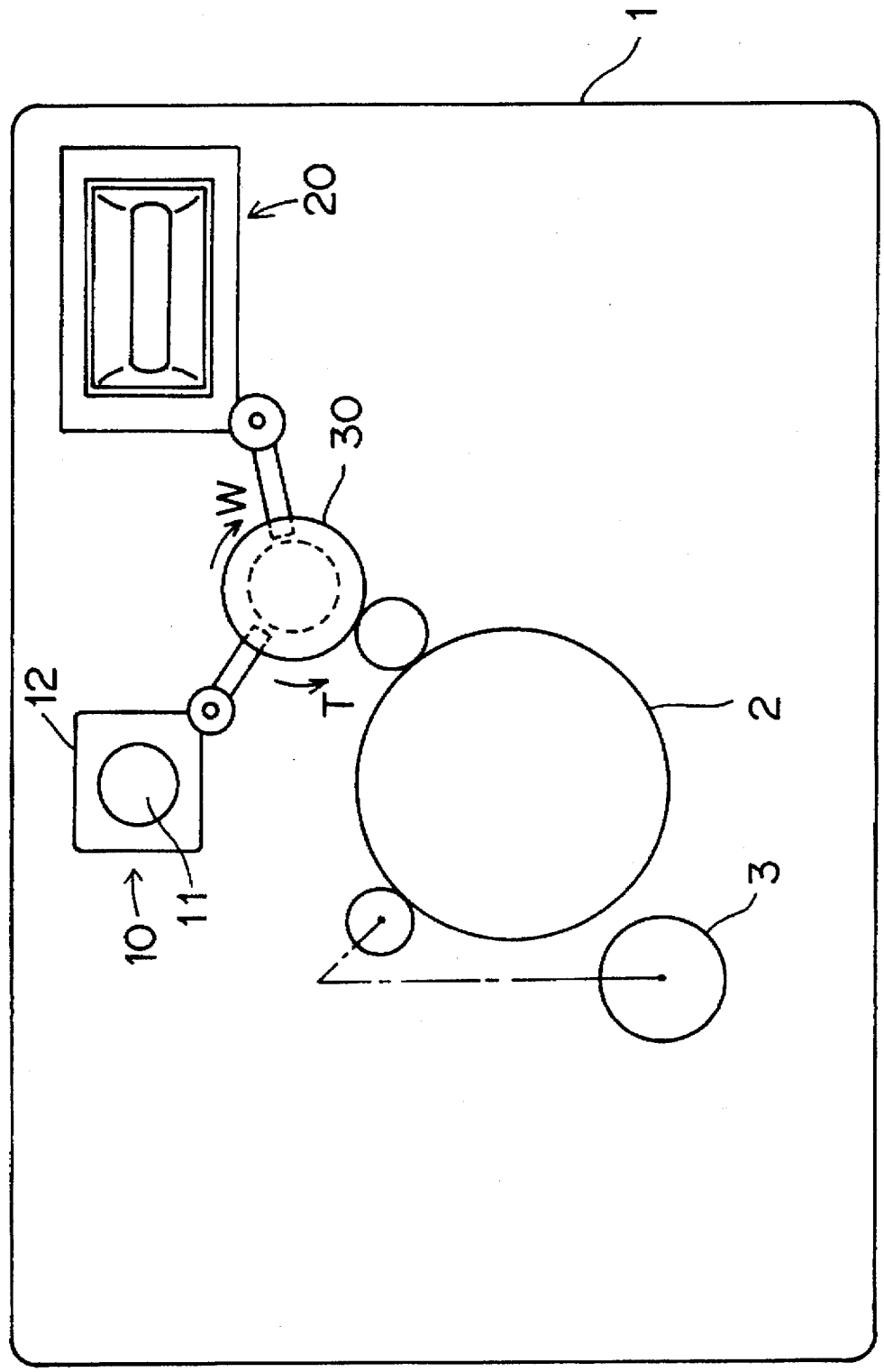
FIG. 1 is a schematic front view of a camera which is a first embodiment of the present invention.
Figure 2:
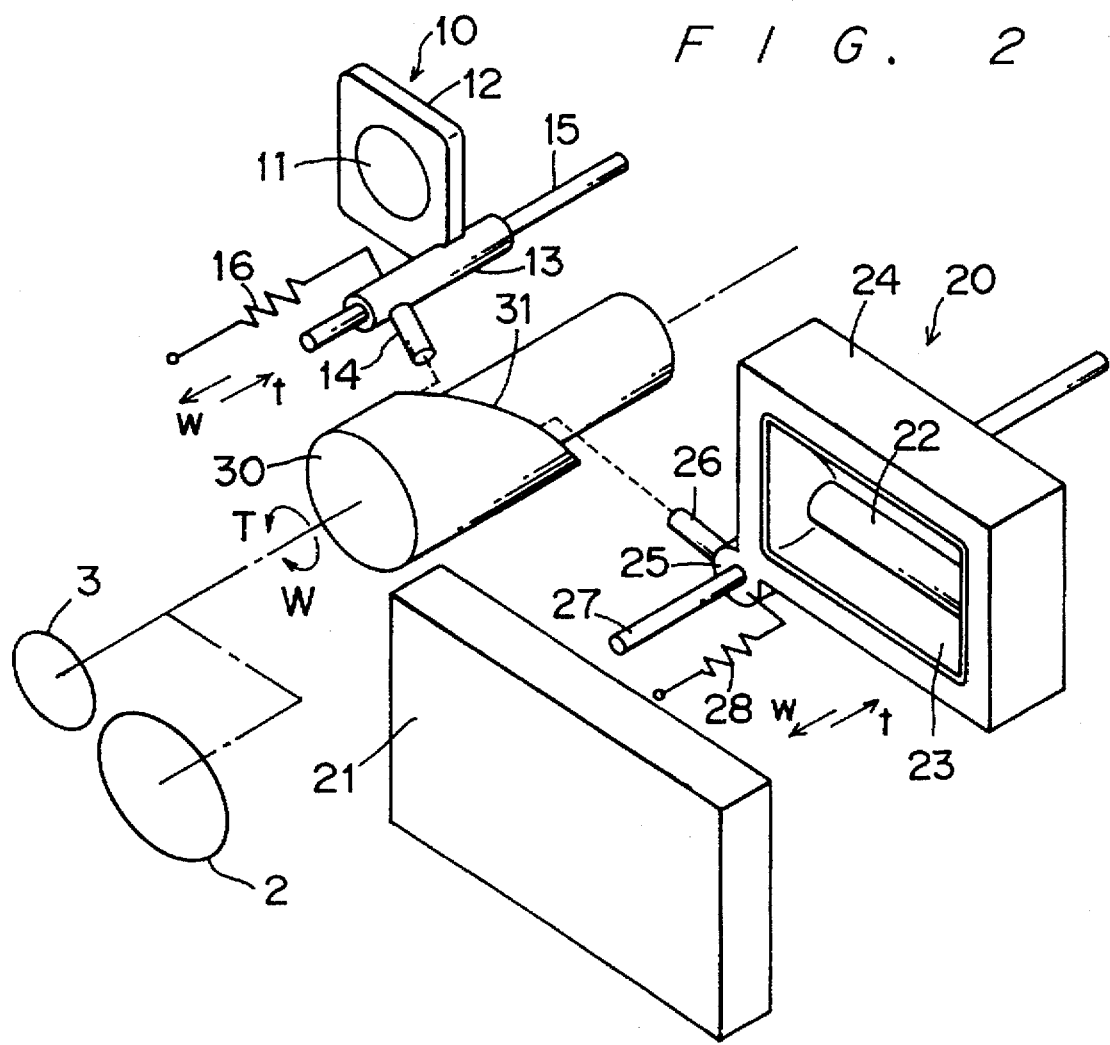
FIG. 2 is a perspective view of the camera of the first embodiment.

In FIGS. 1 and 2, numeral 1 denotes a camera body case; numeral 10 denotes a finder; numeral 20 denotes a flash; and numeral 30 denotes a cam. The cam 30 has a cam surface 31 around a cylindrical body. The drive source of the cam 30 is a motor 3 which also drives a zoom mechanism of a photographic lens 2, and the cam 30 is movable following the zoom mechanism of the photographic lens 2. More specifically, when the photographic lens 2 moves in a tele direction, the cam 30 rotates in a direction indicated by arrow T, and when the photographic lens 2 moves in a wide direction, the cam 30 rotates in a direction indicated by arrow W.

In the finder 10, a lens 11, which is a member to be moved for a zoom, is supported by a holder 12. A slider 13 is provided to be integrated with the holder 12 and to be freely move on a zoom shaft 1S which is parallel to the cam 30. Further, a cam follower 14 stands on the slider 13. The slider 13 is pulled in the wide direction (indicated by arrow w) by a coil spring 16, and thereby, the cam follower 14 is in contact with the cam surface 31 and moves following the variation of the cam surface 31.

The flash 20 comprises a flash panel 21 fixed to the body case 1, a xenon flash lamp 22, a reflector 23 and a holder 24. The xenon flash lamp 22 and the reflector 23 are members to be moved for a zoom and are supported by the holder 24. A slider 25 is provided to be integral with the holder 24 and to be freely move on a zoom shaft 27 which is parallel to the cam 30. A cam follower 26 stands on the slider 25. The slider 25 is pulled in the wide direction (indicated by arrow w) by a coil spring 28, and thereby, the cam follower 26 is in contact with the cam surface 31 and moves following the variation of the cam surface 31.

Figure 3:
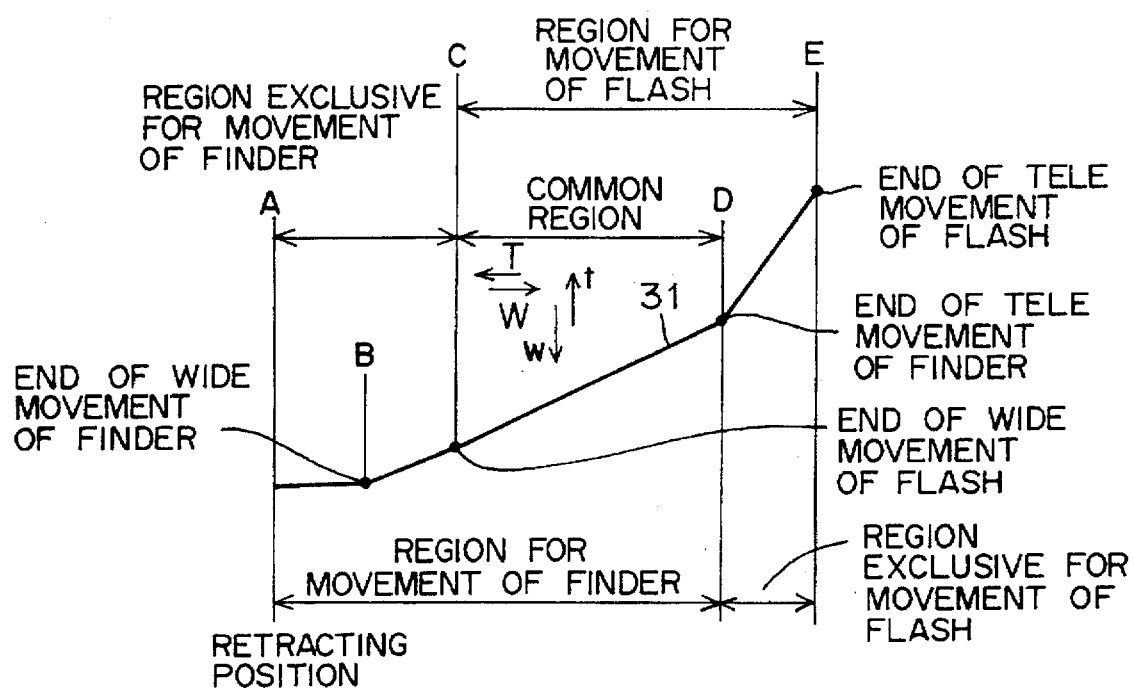
FIG. 3 is a chart explaining a cam surface of the first embodiment.

In the first embodiment, the cam surface 31 has a shape as shown by the unfolded view of FIG. 3. The cam follower 26 is in contact with the cam surface 31 at a further position in the tele direction than the cam follower 14. When the photographic lens 2 is in a retracting position, the cam follower 14 which moves the finder 10 is in contact with the cam surface 31 at a point A. The cam 30 rotates in the direction of arrow T, and when the cam follower 14 comes to a point B of the cam surface 31, the cam follower 14 starts moving In the tele direction t. Thereafter, the cam follower 14 moves in the tele direction t following the variation of the cam surface 31, and when the cam follower 14 comes to a point D of the cam surface 31, the cam follower 14 stops the tele movement. The cam follower 26 which moves the flash 20 is out of contact with the cam surface 31, that is, does not move in a wide side. More specifically, when the cam follower 26 is at a point C of the cam surface 31, the front side of the holder 24 is in contact with the flash panel 21, and the holder 24 and the cam follower 26 cannot move further in the wide direction w. Accordingly, in a tele movement in the direction t, the cam follower 26 starts moving when the cam 30 rotates to come to such a position that the cam follower 26 comes into contact with the cam surface 31 at the point C. Thereafter, the cam follower 26 moves in the tele direction t following the variation of the cam surface 31, and when the cam follower 26 comes to a point E of the cam surface 31, the cam follower 26 stops the tele movement.

In the cam surface 31, a region between the points A and D is used for movement of the finder 10, a region between the points C and E is used for movement of the flash 20, and a region between the points C and D is commonly used for movement of the finder 10 and for movement of the flash 20. A region between the points A and C in the wide side is used only for movement of the finder 10, and a region between the points D and E in the tele side is only used for movement of the flash 20.

A desired zoom movement characteristic of the finder 10 and a desired zoom movement characteristic of the flash 20 are not the same. A zoom movement of the finder 10 for a zoom is required to be comparatively accurate, while a zoom movement of the flash 20 may be comparatively rough. Therefore, the shape of the common region between the points C and D is determined considering the zoom movement characteristic of the finder 10 prior to the zoom movement characteristic of the flash 20. However, the shape of the region between the points D and E in the tele side is determined to match the zoom movement characteristic of the flash 20 because the region is used only for movement of the flash 20. Needless to say, the region between the points A and C in the wide side is determined to match the zoom movement characteristic of the finder 10 because the region is used only for movement of the finder 10.

Second Embodiment; See FIGS. 4 and 5

The structure of the second embodiment, as shown in FIG. 4, is basically the same as that of the first embodiment shown in FIG. 2. The same members and parts are provided with the same reference symbols as seen in FIG. 2, and the description of these members and parts is omitted. What is different from the first embodiment are that directions of rotation of the cam 30 for a wide movement and for a tele movement are reversed and that the cam follower 26 which moves the flash 20 is in contact with the cam surface 32 of the cam 30 at a position further in the wide direction (indicated by arrow w) than the cam follower 14 which moves the finder 10. Accordingly, the shape of the cam surface 32 (see FIG. 5) is different from that of the cam surface 31 of the first embodiment. Further, in order to regulate movement of the lens 11 of the finder 10 in the wide direction, a stopper 17 is provided, and the holder 12 is to come into contact with the stopper 17.

Figure 5:
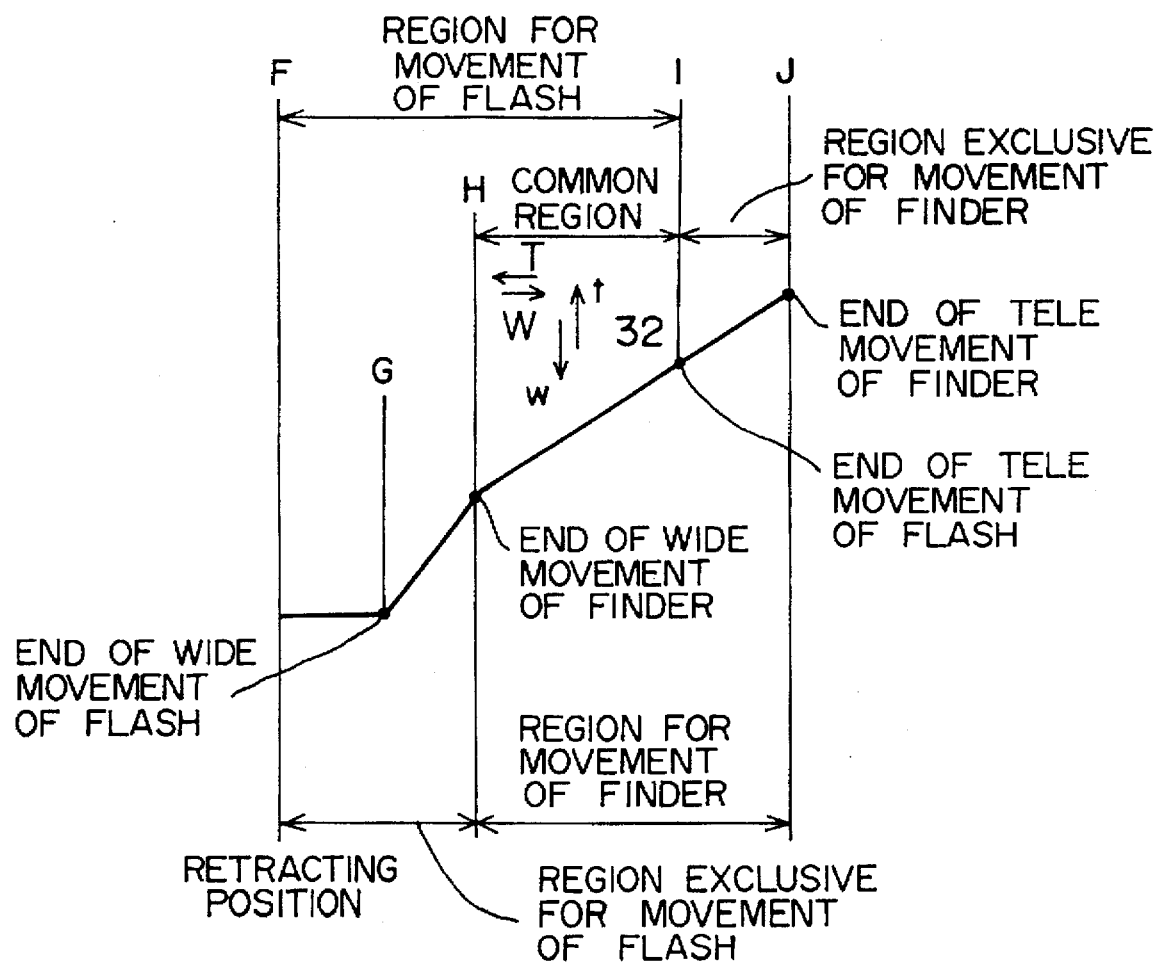
FIG. 5 is a chart explaining a cam surface of the second embodiment.

Referring to FIG. 5, when the photographic lens 2 in a retracting position, the cam follower 26 is in contact with the cam surface 32 at a point F. The cam 30 rotates for a tele movement (in the direction indicated by arrow T), and when the cam follower 26 comes to a point G of the cam surface 32, the cam follower 26 starts moving in the tele direction (indicated by arrow t). Thereafter, the cam follower 26 moves in the tele direction t following the variation of the cam surface 32, and when the cam follower 26 comes to a point I of the cam surface 32, the cam follower 26 stops the tele movement. The cam follower 14 is out of contact with the cam surface 32, that is, does not move in a wide side. More specifically, when the cam follower 14 is at a point H, the holder 12 is in contact with the stopper 17, and the holder 12 and the cam follower 14 cannot move further in the wide direction w. Accordingly, in a tele movement in the direction of arrow t, the cam follower 14 starts moving when the cam 30 rotates to come to such a position that the cam follower 26 comes into contact with the cam surface 32 at the point H. Thereafter, the cam follower 14 moves in the tele direction t following the variation of the cam surface 32, and when the cam follower 14 comes to a point J of the cam surface 32, the cam follower 14 stops the tele movement.

In the cam surface 32, a region between the points F and I is used for movement of the flash 20, a region between the points H and J is used for movement of the finder 10, and a region between the points H and I is commonly used for movement of the flash 20 and for movement of the finder 10. A region between the points F and H in the wide side is used only for movement of the flash 20, and a region between the points I and J in the tele side is used only for movement of the finder 10. For the same reason as described in connection with the first embodiment, the shape of the common region between H and I is determined considering the zoom movement characteristic of the finder 10 prior to that of the flash 20. The shape of the region between the points I and J in the tele side is determined to match the zoom characteristic of the finder 10. The shape of the region between the points F and H is determined to match the zoom characteristic of the flash 20.

Other Embodiments

The shapes of the cam surfaces 31 and 32 and the structures of the cam followers 14 and 26 are arbitrary. Also, the finder 10 and the flash 20 may be of any type.

Although the present invention has been described in connection with the preferred embodiments above, it is to be noted that various changes and modifications are possible to those who are skilled in the art. Such changes and modifications are to be understood as being within the present invention.

What is claimed is:

1. A camera wherein a flash and a finder move for a zoom, the camera comprising:

a drive source;

a cam which operates by said drive source, the cam having a cam surface;

a finder which has a first cam follower which is in contact with the cam surface at a first position; and a flash which has a second cam follower which is in contact with the cam surface at a second position different from the first position;

wherein the first and second cam followers move following operation of the cam, thereby moving the flash and the finder.

2. A camera as claimed in claim 1, wherein the first cam follower and the second cam follower move within a first range and within a second range, respectively, while keeping in contact with the cam surface, the second range extending to a further tele side than the first range.

3. A camera as claimed in claim 2, wherein the second cam follower is biased in a wide direction.

4. A camera as claimed in claim 3, wherein the second cam follower is out of contact with the cam surface when the photographic lens is in a retracting position.

5. A camera as claimed in claim 1, wherein the first cam follower and the second cam follower move within a first range and within a second range, respectively, while keeping in contact with the cam surface, the second range extending to a further wide side than the first range.

6. A camera as claimed in claim 5, wherein the first cam follower is biased in a wide direction.

7. A camera as claimed in claim 6, wherein the first cam follower is out of contact with the cam surface when the photographic lens is in a retracting position.

8. A method of moving a finder and a flash of a camera for a zoom, the method comprising the steps of:

moving a photographic lens for a zoom;

operating a cam with a cam surface following the zoom movement of the photographic lens; and moving a first cam follower which is provided to the finder and is in contact with the cam surface and a second cam follower which is provided to the flash and is in contact with the cam surface following the operation of the cam.

9. A moving mechanism for a flash and finder of a camera, the moving mechanism comprising:

a movable cam having a cam surface;

a finder having a first cam follower in contact with said cam surface so that said finder moves when said cam is moved; and a flash having a second cam follower in contact with said cam surface so that said flash moves when said cam is moved.

* * * * *